US006662408B2

(12) United States Patent
Perez et al.

(10) Patent No.: US 6,662,408 B2

(45) Date of Patent: Dec. 16, 2003

(54) ELEVATOR LOAD BEARING TERMINATION ASSEMBLY WITH GRIPPING INSERTS

(75) Inventors: Jose Sevilleja Perez, Madrid (ES); Juan Martin Martin, Madrid (ES)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/947,950

(22) Filed: Sep. 6, 2001

(65) Prior Publication Data

US 2003/0041419 A1 Mar. 6, 2003

(51) Int. Cl.[7] ................................................ F16G 11/00

(52) U.S. Cl. ................ 24/136 R; 24/115 M; 24/136 L; 187/412; 187/406; 403/314

(58) Field of Search .......................... 24/136 R, 115 M, 24/136 L, 136 K; 403/211, 314, 374.1; 187/411, 412, 404, 406

(56) References Cited

U.S. PATENT DOCUMENTS

| | | | | | |
|---|---|---|---|---|---|
| 2,130,040 | A | | 9/1938 | Siler | |
| 2,482,231 | A | * | 9/1949 | White | 24/132 R |
| 2,977,654 | A | * | 4/1961 | Page | 403/211 |
| 3,335,470 | A | * | 8/1967 | Baer | 403/211 |
| 3,811,155 | A | * | 5/1974 | Stafford | 182/5 |
| 3,905,711 | A | * | 9/1975 | Rogers | 24/115 M |
| 4,295,749 | A | * | 10/1981 | McBride | 403/211 |
| 4,572,565 | A | * | 2/1986 | Epstein | 24/115 M |
| 4,602,891 | A | * | 7/1986 | McBride | 24/136 K |
| 4,718,788 | A | * | 1/1988 | Briscoe | 24/115 M |
| 5,199,137 | A | * | 4/1993 | Edwards | 24/136 K |
| 5,553,360 | A | * | 9/1996 | Lucas et al. | 24/115 M |
| 6,058,575 | A | * | 5/2000 | Dagan | 24/115 M |
| 6,345,419 | B1 | * | 2/2002 | Traktovenko | 24/136 R |

FOREIGN PATENT DOCUMENTS

| | | | | |
|---|---|---|---|---|
| DE | 2511953 | A1 | * | 9/1976 |
| DE | 31 43217 | A1 | | 5/1983 |
| JP | 1-242385 | | * | 9/1989 |
| JP | 05-039180 | | * | 2/1993 |
| JP | 5-172190 | | * | 7/1993 |
| JP | 2001-165245 | | * | 6/2001 |
| WO | WO 0073131 | A1 | * | 7/2000 |
| WO | WO01/51400 | A1 | | 7/2001 |

OTHER PUBLICATIONS

International Search Report mailed Nov. 26,2002.

* cited by examiner

*Primary Examiner*—Robert J. Sandy
*Assistant Examiner*—André L. Jackson
(74) *Attorney, Agent, or Firm*—Carlson, Gaskey & Olds

(57) ABSTRACT

A device for securing an end on a load bearing member in an elevator system includes a socket, a wedge and at least one insert member. The socket at least partially receives the insert member and wedge to maintain the end of the load bearing member in position. The preferred arrangement includes two insert members that engage the load bearing member on opposite sides of the wedge such that the load bearing member is gripped between the wedge and the insert members. The insert members and the socket preferably include contoured surfaces that facilitate arranging the engaging surfaces on the inserts in a parallel alignment to most evenly distribute pressure on the load bearing member.

26 Claims, 3 Drawing Sheets

3/3

ELEVATOR LOAD BEARING TERMINATION ASSEMBLY WITH GRIPPING INSERTS

BACKGROUND OF THE INVENTION

This invention generally relates to elevator support systems. More particularly, this invention relates to a device for securing an end of a load bearing arrangement in an elevator system.

Elevator systems typically include some form of load bearing member, such as roping or a belt for supporting and moving the cab through the hoistway as desired. In some situations, the belt couples a counterweight to the cab.

Regardless of the specific configuration of the elevator system, it typically is necessary to secure ends of the belt to an appropriate structure within the elevator system. A variety of configurations of assemblies for securing the ends of a belt in an elevator system have been used. One example includes a cast socket and wedge arrangement where a portion of the belt is secured between the socket and wedge. One drawback associated with currently used arrangements is that the casting process is relatively expensive.

Not only is a casting process often expensive, but it limits the ability to maximize the design of the belt-engaging surfaces within the socket. Because a cast socket has inside surfaces that are not easily accessible, it is often difficult to treat the belt-engaging surfaces in a manner to enhance the gripping characteristics of the assembly once the socket is formed. Forming grooves on the inner socket surfaces during the casting process is often considered too expensive.

Another shortcoming of current systems is that the casting process is not accurate enough to provide the dimensional tolerances needed for many situations. One particular issue is presented by the need to establish and maintain a parallel alignment between opposite sides of the socket and opposite sides of the wedge. Without a truly parallel alignment, the forces on the load bearing member are not evenly distributed and belt life is compromised. Current designs and manufacturing approaches do not permit consistent alignment of the socket and wedge surfaces that engage the load bearing member.

There is a need for an improved elevator load bearing termination arrangement. This invention addresses that need and overcomes the shortcomings described above.

SUMMARY OF THE INVENTION

In general terms, this invention is a device for securing an end of a load bearing member such as a belt in an elevator system. The device includes a socket and a wedge that is received within the socket. The socket also supports at least one insert that is received between the socket and the wedge to engage a side of the load bearing member. The insert preferably includes a contoured surface on the side that is received against the socket, which cooperates with a corresponding contour on the socket. The contoured surface preferably is at least partially rounded to permit the position of the insert to be adjusted within the socket to ensure a desired alignment of belt-engaging surfaces on both sides of the belt.

The insert preferably includes an engaging surface on the side of the insert that faces toward the belt. In one example, the engaging surface includes grooves for better frictional engagement with the belt.

This invention includes using an insert on each side of the wedge within the socket. Because the inserts are made as separate parts from the socket, including an engaging surface on the belt engaging side is easy to accomplish.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
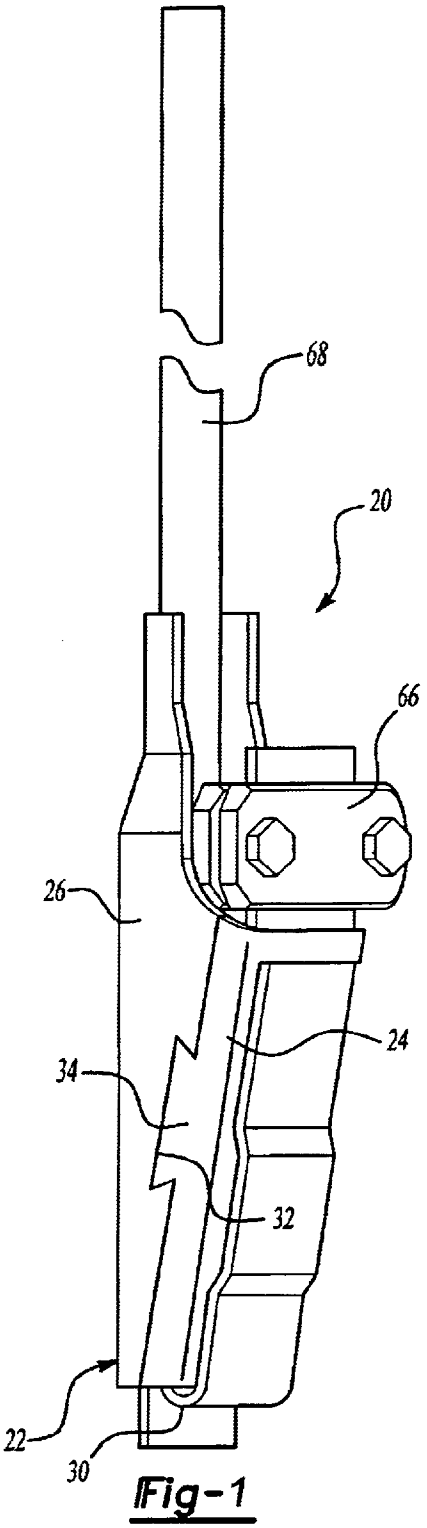
FIG. 1 diagrammatically illustrates a device designed according to this invention.
Figure 2:
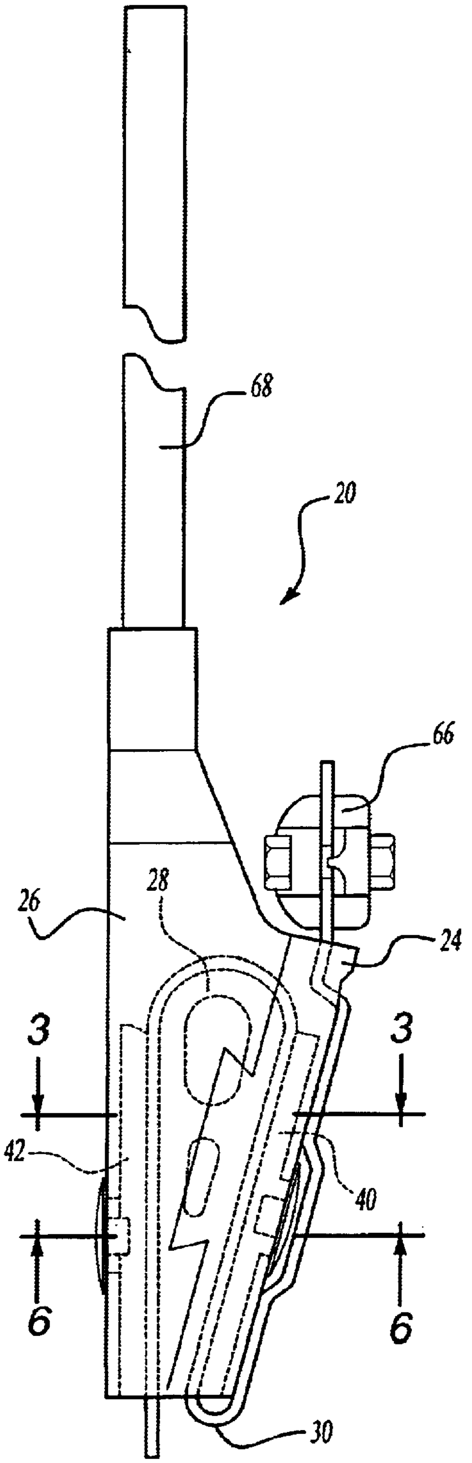
FIG. 2 is a side view of the embodiment of FIG. 1.

A device 20 for handling an end of a load bearing member 30 in an elevator system includes a socket 22. In the illustrated example, two socket portions 24 and 26 cooperate with each other and a wedge 28 to secure the end of the load bearing member 30 into a desired position. A two-piece socket has advantages in simplifying the manufacture of the socket. A one-piece socket is also within the scope of this invention.

Figure 3:
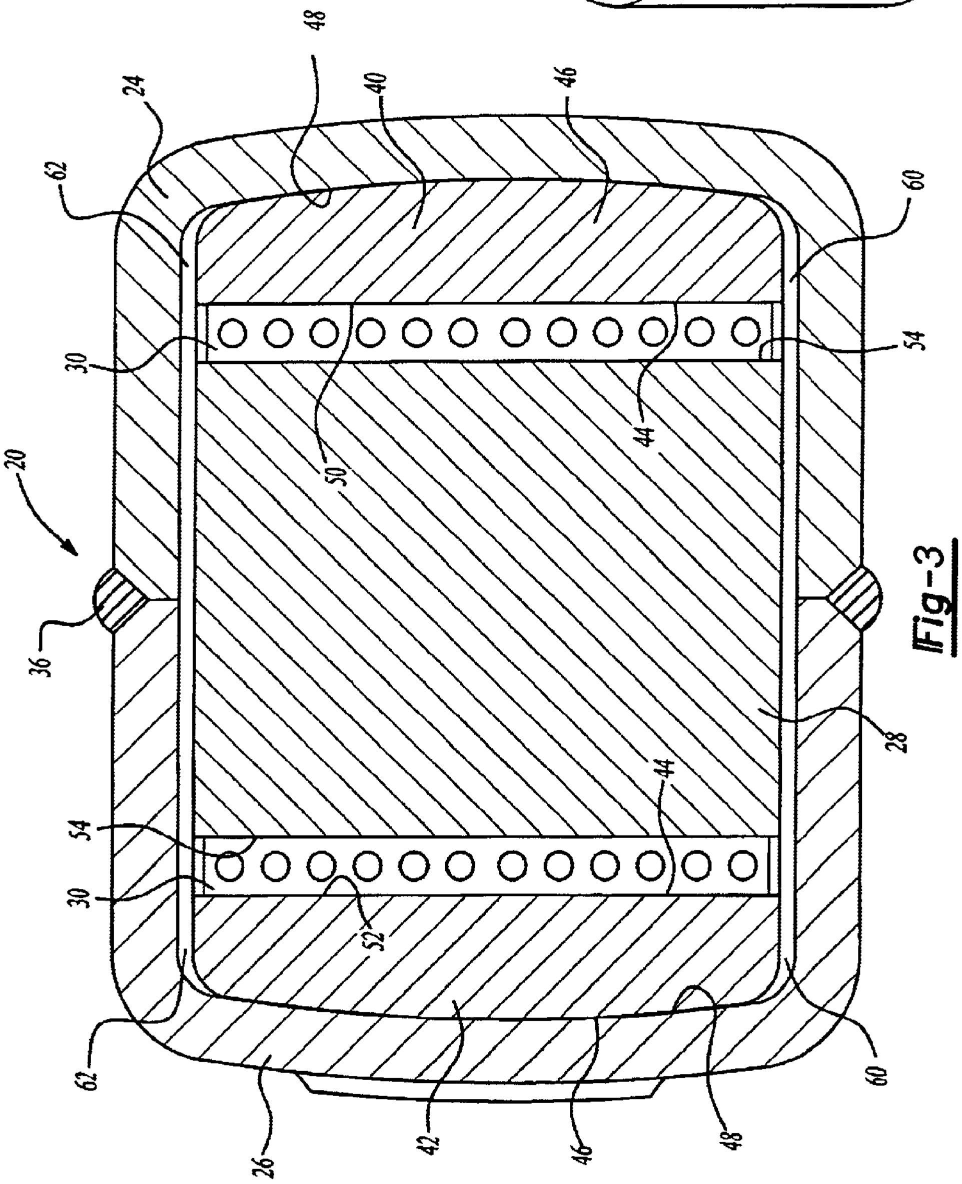
FIG. 3 is a cross sectional view along the line 3—3 in FIG. 2.

As can be appreciated from the drawings, the socket portions 24 and 26 in the illustrated example include a generally u-shaped, channel configuration. The open end of each channel is placed against the open end of the other and the two portions are secured together. The illustrated example includes a dovetail arrangement including a receiver 32 on the second socket portion 26 that receives a dovetail 34, which is on the first socket portion 24. The two socket portions preferably are secured together using welding, which is illustrated at 36 in FIG. 3. Alternative arrangements for securing the socket portions together in embodiments where a two-piece socket is used are possible. Those skilled in the art who have the benefit of this description will be able to select the appropriate geometries and connecting methods to meet the needs of their particular situation.

The load bearing member 30 in the illustrated example is a coated steel belt. This invention is not limited, however, to coated steel belts. Rather, any load bearing member within an elevator system that can be accommodated using a socket and wedge arrangement designed according to this invention may be used. The term "belt" as used in this description should not be construed in its strictest sense. It should be considered synonymous with roping or load bearing member.

The currently preferred arrangement includes two inserts 40 and 42 that are received within the socket 22. In the illustrated example, the insert 40 is associated with the socket portion 24 while the insert 42 is associated with the socket portion 26. The inserts preferably include an outer contour 46 that cooperates with a correspondingly contoured inner surface 48 on the socket. The contour of the surface 46 preferably is at least partially rounded to permit adjustment of the insert 42 relative to the socket 22. Having adjustably positionable inserts 40 and 42 allows the belt engaging surfaces 50 and 52 to be aligned as desired to most evenly distribute pressure on the belt 30.

The illustrated example includes contoured surfaces on the inserts 40 and 42 and the socket portions 24 and 26, which have a varying radius along at least a portion of the cooperating surfaces. The radii are chosen to accommodate the belt and socket dimensions of a particular embodiment and can be varied as necessary. Given this description, those skilled in the art will be able to determine the appropriate dimensional relationships that will best suit their particular situation.

The illustrated example includes a generally concave surface on the socket and a generally convex surface on the inserts. The orientation of the cooperating contoured surfaces can best be appreciated from FIG. 3.

The overall size of the inserts 40 and 42 allows for movement of the inserts within the socket so that the automatic adjustment of the belt engaging surfaces 50 and 52 is possible. Accordingly, there is some clearance shown at 60 and 62 between edges of the insert portions and the interior of the socket. Such clearance permits the insert portions to move relative to the socket into a position where the belt engaging surfaces are aligned as desired.

At least one insert preferably is used to provide adjustment of the belt engaging surfaces of the assembly 20. With at least one insert member, any variation in surface alignment of an oppositely facing socket surface can be compensated as the insert moves into a desired position to most evenly distribute the pressure on the belt 30. The alignment preferably occurs automatically as a result of forces on the assembly caused by the weight of the system components.

Figure 4:
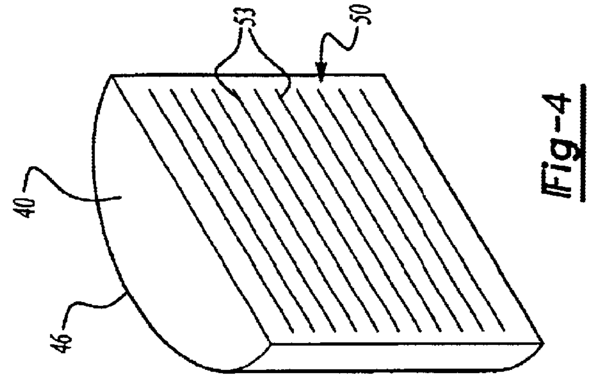
FIG. 4 shows selected features of a portion of the embodiment of FIG. 1.

Having two inserts maximizes the ability to achieve evenly distributed forces. Utilizing two insert members provides the further advantage of having a friction-enhancing or transversely grooved belt-engaging surface on each side, which does not require complex manufacturing as is necessary when an interior surface on a socket is grooved. Any known machining technique can provide the grooves 53 or knurling on the belt engaging surfaces 50 and 52 of the inserts. As schematically shown in FIG. 4, the grooves preferably extend in a direction perpendicular to the length of the belt 30.

The inserts 40 and 42 can be made using a variety of materials. The example of the illustrations includes sintered steel inserts. The inserts can be cast, formed or machined in a known manner. Other metals or suitably hard synthetic materials may be used. Given this description, those skilled in the art will be able to choose from among commercially available materials and a correspondingly appropriate method of forming the inserts to meet the needs of their particular situation. For example, the friction-enhancing surface characteristics may be formed onto the inserts during the process of making the inserts or may be machined onto the insert surfaces after the inserts have been formed.

In one example, the belt engaging surfaces 50 and 52 on the inserts preferably are aligned to be exactly parallel. The rounded, cooperating contours (i.e., the surfaces 46 and 48) permit self-alignment of the inserts. The belt engaging surfaces 50 and 52 preferably have a surface that is friction-enhancing (i.e., includes grooves 53) to better secure the belt 30 within the assembly 20. The belt engaging surface 54 on the wedge 28 preferably has grooves or another friction-enhancing surface for the same purpose.

The socket 22 is designed to allow for placing the inserts 40 and 42 into the socket in combination with the wedge 28 to secure the belt 30 in place. In one example, the two socket portions are welded together. Sheet metal is a preferred material for the socket to accommodate welding.

Figure 5:
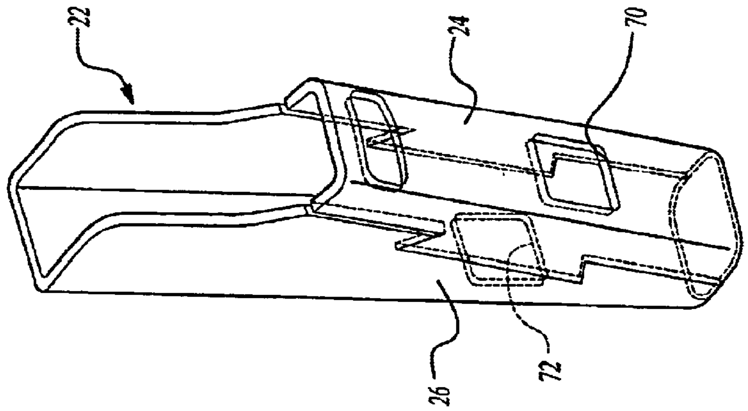
FIG. 5 schematically shows a selective feature of the example socket of FIGS. 1 through 3.

The illustrated example includes a feature that facilitates maintaining the inserts within the socket during the belt placement procedure. As best appreciated from FIGS. 5 and 6, the socket preferably includes openings 70 and 72 on opposite sides. The insert 40 includes a boss 74 that extends at least partially into the opening 70 on the socket portion 24. A recess 76 preferably extends through a center of the boss 74 toward the interior of the insert 40.

A stem portion 78 of a holding member 79 preferably is at least partially received within the recess 76. The stem 80 preferably includes a plurality of ribs 78 that facilitate maintaining the holding member 79 in place on the insert 40.

The holding member 79 preferably includes a flange portion 82 that has an outside dimension that is greater than the size of the opening 70 so that at least a portion of the holding member 79 remains outside of the socket 22.

Similarly, a holding member 84 facilitates holding the insert 46 in place while positioning and securing the belt 30 within the assembly. The insert 46 includes a boss 86 having an opening 88. A stem 90 on the holding member 84 preferably includes flexible ribs 92 that facilitate maintaining the holding member 84 in place. A flange portion 94 on the holding member 84 preferably extends outside the opening 72 on the socket portion 26.

Figure 6:
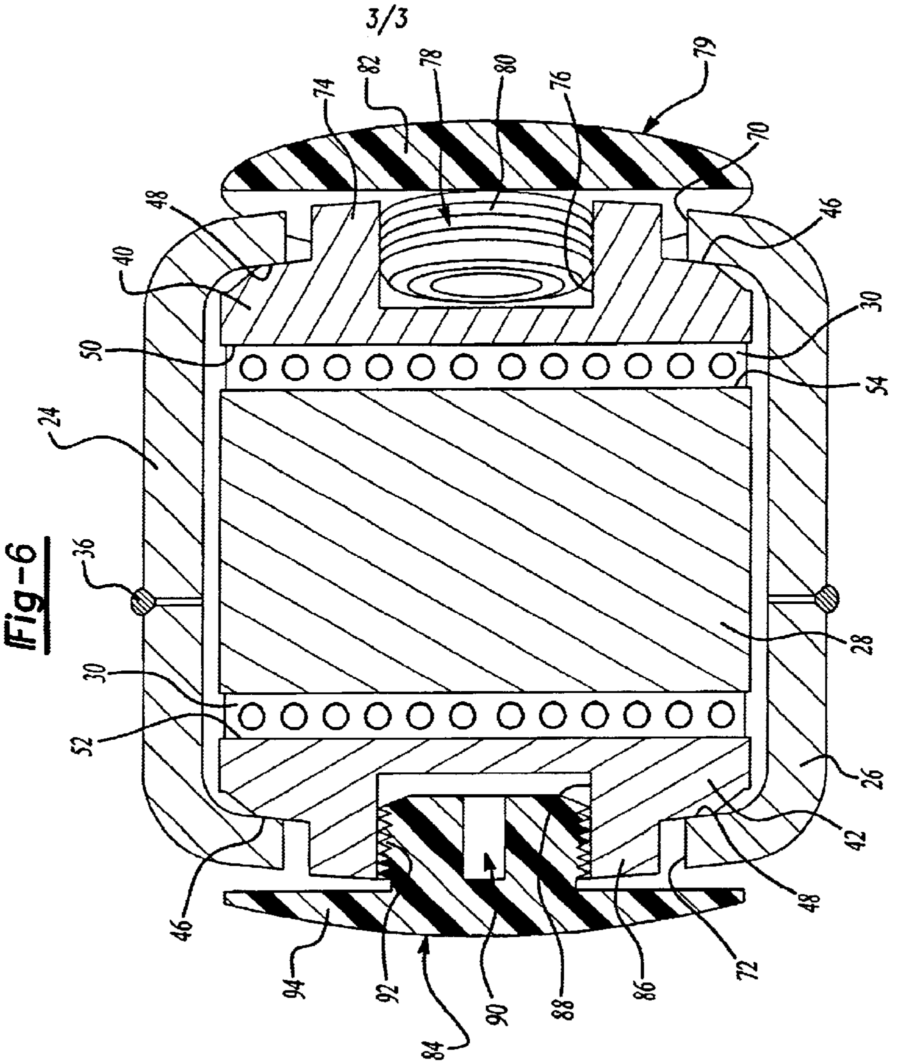
FIG. 6 is a cross sectional illustration taken along the lines 6—6 in FIG. 2.

The holding members 79 and 84 preferably are made from a plastic material and are put into the position illustrated in FIG. 6 to prevent the inserts 40 and 42 from sliding out of the socket during assembly. The bosses 74 and 86 and the openings 70 and 72 preferably are dimensioned so that the use of the holding members 79 and 84 do not later interfere with the automatic adjusting feature of the inventive assembly as described above. The openings 70 and 72 preferably are dimensioned large enough to provide clearance between the opening and the respective bosses so that the movement of the inserts 40 and 42 is not restricted and that a desired alignment of the belt engaging surfaces remains possible.

A conventional belt termination clip 66 preferably is provided near the terminal end of the belt 30 as a further safeguard against slippage. A conventional connecting member 68 facilitates connecting the assembly 20 to another portion of the elevator system.

The preceding description is exemplary rather than limiting in nature. Variations and modifications to the disclosed embodiment may become apparent to those skilled in the art that do not necessarily depart from the essence of this invention. The scope of legal protection given to this invention can only be determined by studying the following claims.

We claim:

1. A device for securing an end of an elongated load bearing member in an elevator system, comprising:

a first socket portion;

a second socket portion that is secured to the first socket portion;

a wedge that is at least partially received between the socket portions such that some of the elongated load bearing member is received between the socket portions and the wedge;

a first insert member that is at least partially received between the first socket portion and the wedge such that a corresponding portion of the load bearing member is secured between the wedge and the first insert member; and a second insert member that is at least partially received within the second socket portion such that another portion of the load bearing member is secured between the wedge and the second insert member, the insert members having an alignment surface that faces opposite a load bearing member engaging surface and that directly engages and cooperates with a corresponding alignment surface on the respective socket portions such that the insert members automatically move into an alignment with the wedge that provides a uniform distribution of pressure on the corresponding portions of the load bearing member.

2. The device of claim 1, wherein each insert member alignment surface has a contoured surface that is at least partially rounded with a radius of curvature that is oriented transverse to a length of the corresponding portion of the load bearing member.

3. The device of claim 1, wherein each insert member load bearing member engaging surface includes a plurality of grooves oriented traverse to a length of the corresponding portion of the load bearing member.

4. The device on claim 1, wherein the insert members engaging surfaces are planar.

5. A device for securing an end of an elongated load bearing member in an elevator system, comprising:

a socket;

a wedge that is at least partially received within the socket such that a first portion of the elongated load bearing member is received between the socket and the wedge; and at least one insert member that is at least partially received within the socket such that a second portion of the load bearing member is secured between the wedge and the insert member, the insert member having an engaging surface that engages one side of the second portion of the load bearing member and an oppositely facing contoured surface that is received directly against a correspondingly contoured surface on the socket with a clearance between the socket and the insert member that allows the insert member to move laterally relative to a length of the second portion of the load bearing member in a manner that positions the insert member in alignment with the wedge.

6. The device of claim 5, wherein the insert member contoured surface cooperates with the contoured socket surface such that the insert member automatically moves into a position where pressure is equally distributed across the second portion of the load bearing member.

7. The device of claim 5, wherein the insert member engaging surface is planar.

8. The device of claim 5, wherein the contoured surface is at least partially rounded.

9. The device of claim 8, wherein the contoured surface has a radius of curvature that is perpendicular to a length of the second portion of the load bearing member.

10. The device of claim 9, wherein the engaging surface includes grooves, aligned perpendicular to a length of the second portion of the load bearing member.

11. The device of claim 5, including two insert members and wherein each insert member is received on an opposite side of the wedge at least partially within the socket.

12. The device of claim 11, including a contoured surface on each insert member and wherein the socket has a first contoured surface that cooperates with the contoured surface on one of the inserts and a second contoured surface that cooperates with the contoured surface on the other insert.

13. The device of claim 12, wherein the cooperating contoured surfaces operate to permit a parallel alignment of each engaging surface with a corresponding surface on the wedge.

14. The device of claim 11, wherein each of the insert members engages the same load bearing member.

15. The device of claim 5, wherein the socket includes a first portion and a second socket portion that is at least partially welded to the first socket portion.

16. The device of claim 15, wherein each socket portion includes a channel having a generally u-shaped cross section that extends longitudinally along each portion and wherein an open end of each socket portion is secured against an open end of the other.

17. The device of claim 16, wherein one of the socket portions includes a receiver and the other socket portion includes a dovetail section that is received within the receiver.

18. The device of claim 5, including at least one holding member that cooperates with the insert member to maintain the insert member in a first position within the socket.

19. The device of claim 18, wherein the insert member includes a boss with an opening and the holding member includes a stem portion that is received at least partially within the boss opening and wherein the socket includes an opening through which at least a portion of the boss extends when the insert is held in the first position within the socket.

20. A method of securing an end of an elongated load bearing member in an elevator system using a socket, at least one insert and a wedge, comprising the steps of:

positioning a portion of the load bearing member about an exterior surface on at least a portion of the wedge;

positioning only one side of the insert against a portion of the load bearing member such that the portion of the load bearing member is positioned between the wedge and the insert, including positioning one insert against the load bearing member on one side of the wedge and a second insert against the load bearing member on an opposite side of the wedge; and placing at least a portion of the wedge and at least a portion of the insert within the socket such that an oppositely facing side of the insert directly engages a corresponding surface on the socket and the insert becomes aligned with the wedge and such that the load bearing member is maintained in a selected position relative to the socket and wedge.

21. The method of claim 20, including aligning surfaces on the inserts to be parallel relative to each other.

22. The method of claim 20, including aligning surfaces on the inserts to be parallel relative to respective corresponding surfaces on the wedge.

23. A device for securing an end of an elongated load bearing member in an elevator system, comprising:

a socket;

a wedge that is at least partially received within the socket such that some of the elongated load bearing member is received between the socket and the wedge;

at least one insert member that is at least partially received within the socket between the socket and a surface on a corresponding portion of the load bearing member such that the corresponding portion of the load bearing member is secured between the wedge and the insert member; and at least one holding member that cooperates with the insert member to maintain the insert member in a first position within the socket, the insert member having a boss with an opening and the holding member having a stem portion that is received at least partially within the boss opening and wherein the socket includes an opening through which at least a portion of the boss extends when the insert is held in the first position within the socket.

24. A device for securing an end of an elongated load bearing member in an elevator system, comprising:

a socket;

a wedge that is at least partially received within the socket such that a first portion of the elongated load bearing member is received between the socket and the wedge; and at least one insert member that is at least partially received within the socket such that a second portion of the load bearing member is secured between the wedge and the insert member, the insert member having an engaging surface that engages one side of the second portion of the load bearing member, the engaging surface having grooves aligned perpendicular to a length of the second portion of the load bearing member, and an oppositely facing contoured surface that is at least partially rounded and has a radius of curvature that is perpendicular to the length of the second portion of the load bearing member, the contoured surface is received directly against a correspondingly contoured surface on the socket in a manner that positions the insert member in alignment with the wedge.

25. A device for securing an end of an elongated load bearing member in an elevator system, comprising:

a socket;

a wedge that is at least partially received within the socket such that a first portion of the elongated load bearing member is received between the socket and the wedge; and two insert members that are at least partially received within the socket on opposite sides of the wedge such that a second portion of the load bearing member is secured between the wedge and the insert member, the insert member having an engaging surface that engages one side of the second portion of the load bearing member and an oppositely facing contoured surface that is received directly against a correspondingly contoured surface on the socket in a manner that positions the insert member in alignment with the wedge.

26. A device for securing an end of an elongated load bearing member in an elevator system, comprising:

a socket having a first portion and a second portion that is at least partially welded to the first portion;

a wedge that is at least partially received within the socket such that a first portion of the elongated load bearing member is received between the socket and the wedge; and at least one insert member that is at least partially received within the socket such that a second portion of the load bearing member is secured between the wedge and the insert member, the insert member having an engaging surface that engages one side of the second portion of the load bearing member and an oppositely facing contoured surface that is received directly against a correspondingly contoured surface on the socket in a manner that positions the insert member in alignment with the wedge.

* * * * *